United States Patent
Song et al.

(10) Patent No.: US 8,040,935 B2
(45) Date of Patent: Oct. 18, 2011

(54) METHODS AND APPARATUS FOR SPREAD SPECTRUM MODULATION AND DEMODULATION

(75) Inventors: Chaosheng Song, Shanghai (CN); Xiaoyan Chen, Shanghai (CN)

(73) Assignee: Miartech, Inc., Shanghai (CN)

( * ) Notice: Subject to any disclaimer, the term of this patent is extended or adjusted under 35 U.S.C. 154(b) by 599 days.

(21) Appl. No.: 12/093,525

(22) PCT Filed: Nov. 16, 2006

(86) PCT No.: PCT/CN2006/003080
§ 371 (c)(1),
(2), (4) Date: Aug. 18, 2008

(87) PCT Pub. No.: WO2007/056948
PCT Pub. Date: May 24, 2007

(65) Prior Publication Data
US 2009/0201974 A1    Aug. 13, 2009

(30) Foreign Application Priority Data
Nov. 16, 2005   (CN) .......................... 2005 1 0110393

(51) Int. Cl.
*H04B 1/00*   (2006.01)
(52) U.S. Cl. ...................................................... 375/146
(58) Field of Classification Search .................. 375/130, 375/141, 146–147, 295, 316
See application file for complete search history.

(56) References Cited

U.S. PATENT DOCUMENTS

| | | | |
|---|---|---|---|
| 5,861,834 A * | 1/1999 | Sauer et al. | 342/13 |
| 6,359,875 B1 | 3/2002 | Hamada et al. | |
| 2005/0254466 A1 * | 11/2005 | Rudolf et al. | 370/335 |
| 2006/0202885 A1 * | 9/2006 | Chen | 342/126 |
| 2007/0113159 A1 * | 5/2007 | Lakkis | 714/783 |
| 2011/0019720 A1 | 1/2011 | Fuente | |

FOREIGN PATENT DOCUMENTS

| | | |
|---|---|---|
| CN | 1215949 A | 5/1999 |
| CN | 1107391 C | 4/2003 |
| CN | 1448014 A | 10/2003 |
| CN | 1192509 C | 3/2005 |
| CN | 1222142 C | 10/2005 |

OTHER PUBLICATIONS

The International Search Report corresponding to PCT/CN2006/003080 with a mailing date of Mar. 8, 2007.

* cited by examiner

*Primary Examiner* — Khanh C Tran
(74) *Attorney, Agent, or Firm* — Quarles & Brady LLP (57) ABSTRACT

The present invention relates to a method and an apparatus for spread spectrum modulation and demodulation using a special spread spectrum sequence, characterized in that Golay complementary codes are modulated onto orthogonal channels such that a corresponding complex complementary code is obtained. The signal spread by such complex complementary code has a low peak-to-average power ratio, a sound self-correlation property and cross-correlation property, which can well solve the problem of multi-access interference such that the communication performance of the entire system is improved.

12 Claims, 4 Drawing Sheets

METHODS AND APPARATUS FOR SPREAD SPECTRUM MODULATION AND DEMODULATION

CROSS REFERENCE TO RELATED APPLICATIONS

This application represents the national stage application of International Application PCT/CN2006/003080, filed 16 Nov. 2006, which claims the benefit of Chinese Patent Application 200510110393.2, filed 16 Nov. 2005, which is incorporated herein by reference in its entirety for all purposes.

TECHNICAL FIELD

The present invention relates to spread spectrum modulation and demodulation technology, and more particularly, to a method and an apparatus for spread spectrum modulation and demodulation.

BACKGROUND ART

The fundamental theory upon which spread spectrum communication relies is Shannon formula, which is:

$$C = B \log_2(1+S/N)$$

where C is the system channel capacity (bit/s), B is the bandwidth of the system channel, N is the noise power, and S is the signal power. Shannon formula demonstrates a relationship between the capability for a system channel to transmit information errorlessly, the signal-to-noise ratio (S/N) existing in the channel and the system channel bandwidth (B) for transmitting information. This indicates a trade-off between the channel bandwidth and the signal-to-noise ratio under the condition of certain channel capacity. In communication, the anti-interference capability can be improved by either narrowing the channel bandwidth and increasing the signal power (i.e., increase the signal-to-noise ratio) or reducing the power of the transmitting signal and broadening the channel bandwidth. Spread spectrum communication is a communication system that employs the latter one.

Figure 1:
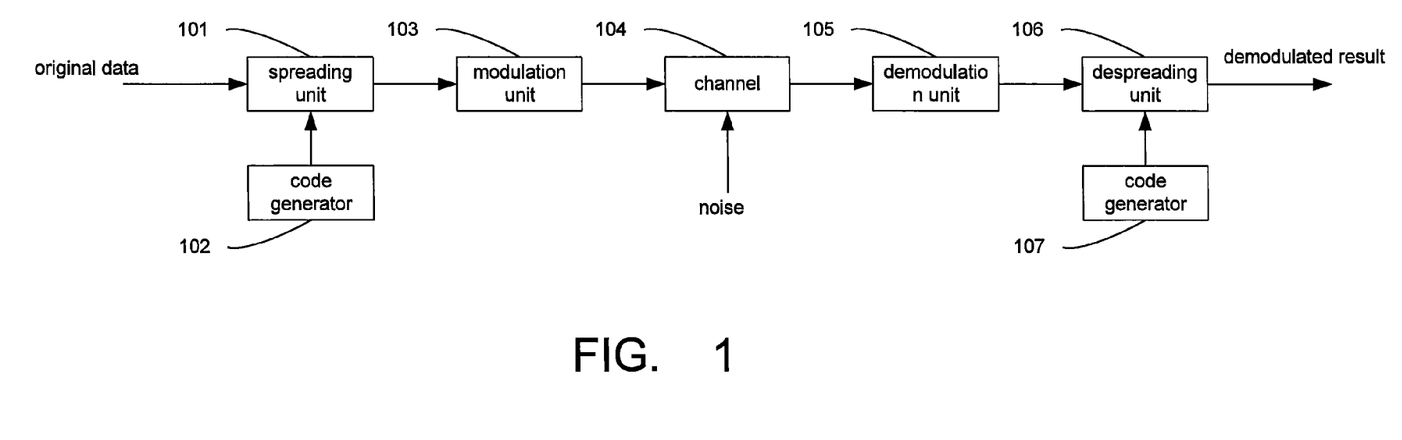
FIG. 1 is a schematic block diagram of a spread spectrum modulation and demodulation system.

FIG. 1 is a schematic block diagram of a spread spectrum modulation and demodulation system. A code generator 102 of a transmitting side generates spread spectrum code chips to spread the original data in a spreading unit 101. Modulation of the spread high-speed data is conducted in a modulation unit 103 in which a transmitting data adapted for the channel is generated. After going through the interference imposed by the channel 104, the transmitting data arrives at a receiver. The receiving side first demodulates the receiving data utilizing a demodulation unit 105, and then performs despreading operation by utilizing a despreading unit 106 and local spread spectrum code chips generated by a code generator 107 of the receiving side, and thus the original data is eventually recovered.

The types of spread spectrum includes direct sequence spread spectrum, frequency hopping, time hopping, etc. The first type—direct sequence spread spectrum is now a most widely used one. The direct sequence spread spectrum communication employs a spread spectrum code sequence to implement the spreading of the frequency spectrum. Generally, the spread spectrum code is implemented by a pseudo random sequence, for example, m sequence, gold sequence, etc. The spread spectrum code chips used in the third generation mobile communication system is walsh code+gold code, wherein the walsh code accomplishes orthogonal feature and the gold code applies interference upon the walsh code so as to level the noise. Although such code chips have a sound self-correlation property, its cross-correlation property is not that good. Users in different cells are subject to severe multi-access interference from the neighboring cells since it is impossible to have the spread spectrum code chips for difference cells synchronized.

SUMMARY OF THE INVENTION

In order to solve the poor cross-correlation property problem in the existing spread spectrum communication system, the present invention provides a method and an apparatus for spread spectrum modulating and demodulating using a complex complementary code as the spread spectrum code.

It is known that the greatest advantage of Golay complementary code is that the non-zero self-correlation value is zero, wherein the self-correlation value is a convolution of code chips themselves and the non-zero self-correlation value is the value when the convolution inputs are completely identical. At the same time, for a given sequence length, there are numerous code chips.

The above described complex complementary code C is generated by an arbitrarily given pair of Golay complementary codes $M=\{m_1, m_2, m_3, m_n\}$ and $N=\{n_1, n_2, n_3, \ldots n_n\}$ according to the following expression:

$$C = \{m_1, n_1 \ast i, m_2, n_2 \ast i, m_3, n_3 \ast i, \ldots m_n, n_n \ast i\}$$

In the above expression, i refers to a usage of orthogonal modulation, that is, the complementary codes M and N are modulated onto orthogonal channels respectively and then combined into the complex complementary code C with a real component of $\{m_1, m_2, m_3, \ldots m_n\}$ and a imaginary component of $\{n_1 \ast i, n_2 \ast i, n_3 \ast i, \ldots n_n \ast i\}$.

Table 1 is a complex complementary code with a maximum length of 32.

| sequence number | M Code | N Code | M + N |
| --- | --- | --- | --- |
| 0 | −1 | 0 | −1 |
| 1 | 0 | i | i |
| 2 | −1 | 0 | −1 |
| 3 | 0 | i | i |
| 4 | −1 | 0 | −1 |
| 5 | 0 | i | i |
| 6 | 1 | 0 | 1 |
| 7 | 0 | −i | −i |
| 8 | −1 | 0 | −1 |
| 9 | 0 | i | i |
| 10 | −1 | 0 | −1 |
| 11 | 0 | i | i |
| 12 | 1 | 0 | 1 |
| 13 | 0 | −i | −i |
| 14 | −1 | 0 | −1 |
| 15 | 0 | i | i |
| 16 | −1 | 0 | −1 |
| 17 | 0 | −i | −i |
| 18 | −1 | 0 | −1 |
| 19 | 0 | −i | −i |
| 20 | −1 | 0 | −1 |
| 21 | 0 | −i | −i |
| 22 | 1 | 0 | 1 |
| 23 | 0 | i | i |
| 24 | 1 | 0 | 1 |
| 25 | 0 | i | i |
| 26 | 1 | 0 | 1 |
| 27 | 0 | i | i |
| 28 | −1 | 0 | −1 |
| 29 | 0 | −i | −i |
| 30 | 1 | 0 | 1 |
| 31 | 0 | i | i |

In practical system, the code length for the complementary code is selected based on data rate as well as the operating clock, and the spread spectrum code chips may be generated according to the below rules with respect to different spread spectrum factors.

| length of code chips | |
|---|---|
| 32 | MN0~MN31 |
| 16 | MN8~MN23 |
| 8 | MN12~MN19 |
| 4 | MN14~MN17 |

Figure 4:
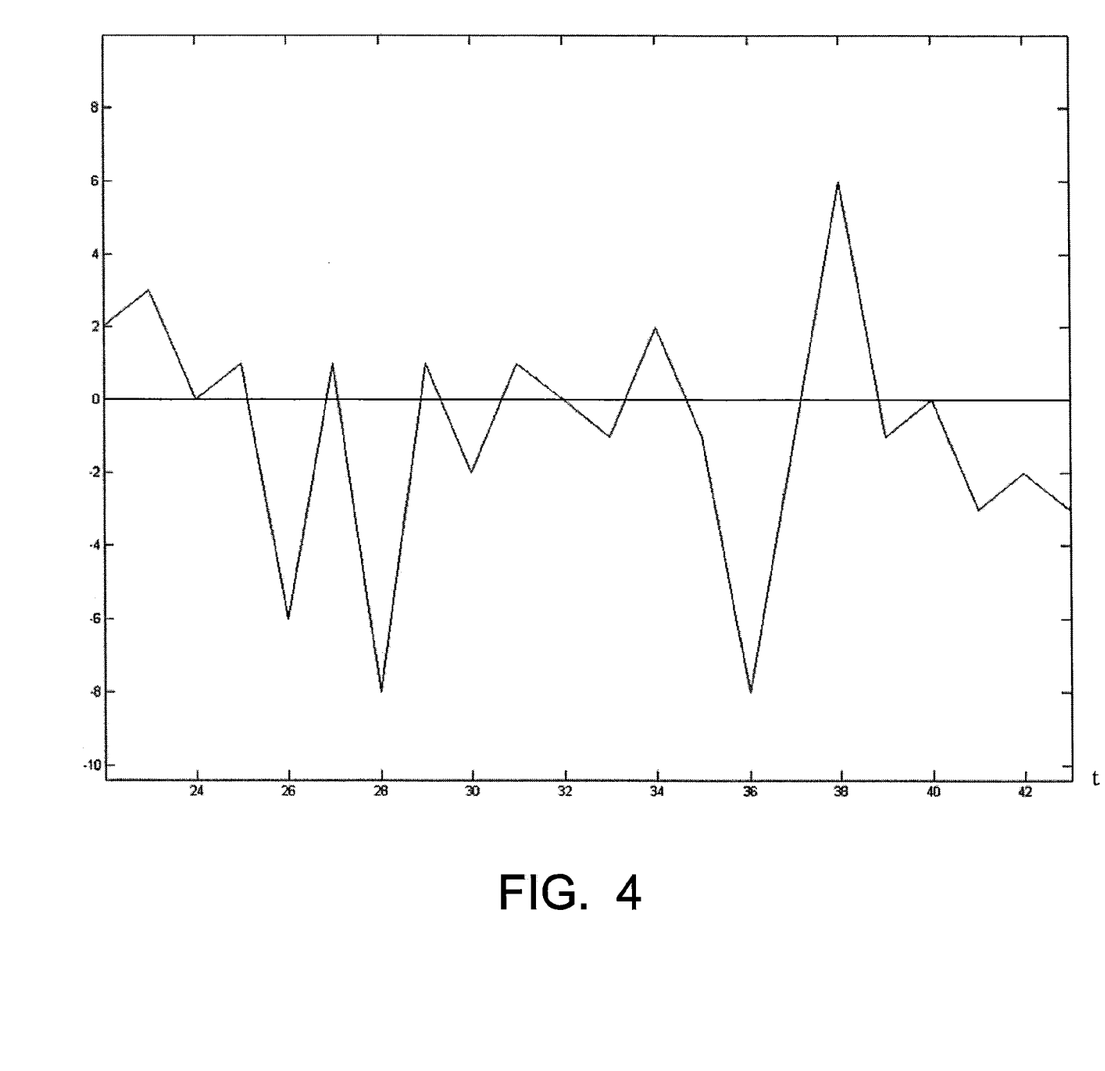
FIG. 4 is a characteristic profile of the cross-correlation property of the Golay complex complementary code with a code length of 32 according to the present invention.

Such complex complementary code has a sound self-correlation property, and has an excellent cross-correlation property when well synchronized. Taking the Golay complex complementary code with a code chips length of 32 as an example, the cross-correlation property of the Golay complex complementary code is depicted in FIG. 4 in which its cross-correlation value is ranged from −2 to +2 near t=32±3. Therefore, as long as the synchronization between different cells using different complex complementary codes as the spread spectrum codes is controlled within the range of ±3 bit, the influence among the cross-correlations of these code chips for different cells can be very little so that the interference among different cells can be significantly reduced.

The present invention provides a spreading and modulation method. The method includes a step for spreading an original signal with spread spectrum codes and a step for modulating the spread data in a QPSK format, wherein the spreading step includes generating spread spectrum code chips by modulating an arbitrary pair of Golay complementary codes onto two orthogonal channels so as to obtain a complex complementary code as the spread spectrum code chips, and spreading the original signal with the complex complementary code.

In the above described spreading and modulation method, the complex complementary code includes a real component and an imaginary component that are orthogonal to each other, serving as an in-phase spread spectrum code and a quadrature spread spectrum code respectively; and during the step of spreading the original signal with the complex complementary code, the in-phase spread spectrum code is used to spread the in-phase sub-channel of the original signal, while the quadrature spread spectrum code is used to spread the quadrature sub-channel of the original signal.

The present invention provides a despreading and demodulation method. The method includes a step for demodulating the receiving signal in a QPSK format, a filtering step for filtering the QPSK demodulated signal to generate an in-phase baseband signal and a quadrature baseband signal, and a despreading step for despreading the in-phase baseband signal the quadrature baseband signal, wherein the spreading step includes the following steps of generating the same spread spectrum code chips as that of the transmitting side, modulating a pair of Golay complementary codes onto two orthogonal channels so as to obtain a complex complementary code as the spread spectrum code chips; and utilizing the complex complementary code to despread the in-phase baseband signal and the quadrature baseband signal.

In the above discussed despreading and demodulation method, the complex complementary code includes a real component and an imaginary component that are orthogonal to each other, serving as an in-phase spread spectrum code and a quadrature spread spectrum code respectively; and the step of utilizing the complex complementary code to despread the receiving signal includes: performing despreading operation upon the in-phase baseband signal with the in-phase spread spectrum code and the quadrature spread spectrum code respectively, and performing despreading operation upon the quadrature baseband signal with the in-phase spread spectrum code and the quadrature spread spectrum code respectively, adding the despreading result of the in-phase baseband signal and the in-phase spread spectrum code and the despreading result of the quadrature baseband signal and the quadrature spread spectrum code to obtain a main output signal which includes the original signal of the transmitting side, and performing subtraction between the despreading result of the in-phase baseband signal and the quadrature spread spectrum code and the despreading result of the quadrature baseband signal and the in-phase spread spectrum code to obtain an auxiliary output signal.

The despreading and demodulation method further includes a synchronization step for performing phase detection and loop filtering upon the main output signal and the auxiliary output signal to obtain a phase error signal for local carrier synchronization.

The present invention further provides a spreading and modulation apparatus, which includes a complex complementary code generator for obtaining a pair of complex complementary codes by modulating an arbitrary pair of Golay complementary codes onto two orthogonal channels, a spreading unit for receiving the complex complementary code from the complex complementary code generator and utilizing the complex complementary code to spread the original signal, a local carrier generator for generating a pair of orthogonal sinusoid modulation signals for QPSK modulation, and a QPSK modulation unit for utilizing the pair of sinusoid modulation signals to modulating the signal spread by the spreading unit in the QPSK format.

In the spreading and modulation apparatus, the complex complementary code includes a real component and an imaginary component that are orthogonal to each other, serving as an in-phase spread spectrum code and a quadrature spread spectrum code respectively. The spreading unit includes an in-phase sub-channel spreading means coupled to the complex complementary code generator for spreading the original signal with the in-phase spread spectrum code, and a quadrature sub-channel spreading means coupled to the complex complementary code generator for spreading the original signal with the quadrature spread spectrum code.

The spreading and modulation apparatus further includes a filtering unit coupled between the spreading unit and the QPSK modulation unit. The filtering unit delivers its output to the QPSK modulation unit after performing baseband filtering upon the signal spread by the spreading unit.

The present invention also provides a despreading and demodulation apparatus, which includes a local carrier generator for generating a pair of orthogonal sinusoid modulation signals for QPSK demodulation, a QPSK demodulation unit for utilizing a pair of sinusoid modulation signals to demodulate the receiving signal in the QPSK format and outputting an QPSK demodulated signal, a filtering unit for performing a low-pass filtering upon the QPSK demodulated signal and outputting an in-phase baseband signal and a quadrature baseband signal, a local complex complementary code generator for modulating a pair of Golay complementary codes onto two orthogonal channels to generate the same complex complementary code as that of the transmitting side, and a despreading unit for receiving the complex complementary code generated by the local complex complementary code generator, utilizing the complex complementary code to despread the in-phase baseband signal and the quadrature baseband signal and outputting a main output signal containing the original signal of the transmitting side and outputting an auxiliary output signal.

In the above despreading and demodulation apparatus, the complex complementary code includes a real component and an imaginary component that are orthogonal to each other, serving as an in-phase spread spectrum code and a quadrature spread spectrum code respectively. The despreading unit includes a main sub-channel despreading module for despreading the in-phase baseband signal with the in-phase spread spectrum code, despreading the quadrature baseband signal with the quadrature spread spectrum code, and adding the results of the two despreading operations to obtain the main output signal containing the original signal of the transmitting side, and an auxiliary sub-channel despreading module for despreading the in-phase baseband signal with the quadrature spread spectrum code, despreading the quadrature baseband signal with the in-phase spread spectrum code, and performing subtraction between the results of the two despreading operations to obtain the auxiliary output signal.

In the despreading and demodulation apparatus, the main sub-channel despreading module includes a first despreading means for despreading the in-phase baseband signal with the in-phase spread spectrum code, a second despreading means for despreading the quadrature baseband signal with the quadrature spread spectrum code, and an adder for adding the results of the two despreading operations to obtain the main output signal.

In the despreading and demodulation apparatus, the auxiliary sub-channel despreading module includes a first despreading means for despreading the in-phase baseband signal with the quadrature spread spectrum code, a second despreading means for despreading the quadrature baseband signal with the in-phase spread spectrum code, and an subtractor for performing subtraction between the results of the two despreading operations to obtain the auxiliary output signal.

The despreading and demodulation apparatus further includes a phase-locked unit. The phase-locked unit includes a phase detector for performing phase detection upon the main output signal and the auxiliary output signal and outputting an phase detection signal, and a loop filter coupled to the phase-locked unit for outputting a phase error signal to the QPSK demodulation unit.

Due to the utilization of the above mentioned complex complementary code, the methods and apparatuses for spread spectrum modulation and demodulation according to the present invention assures very little influence caused by the cross correlation property of code chips for different cells and thus significantly reduces the interference between difference cells provided that the synchronization between different cells using different complex complementary codes be controlled within the range of +3 bit.

The present invention is especially applicable to power line carrier communication since synchronization can be achieved accurately in the power line carrier communication.

BRIEF DESCRIPTION OF THE DRAWINGS

The features and characteristics of the present invention will be further described by the following embodiments and drawings thereof, in which.

PREFERRED EMBODIMENT OF THE INVENTION

The spreading and modulation method according to the present invention includes the following steps:

(1) spreading step: using a complex complementary code $C=\{m_1, n_1{*}i, m_2, n_2{*}i, m_3, n_3{*}i, \ldots m_n, n_n{*}i\}$ as the spread spectrum codes. The complex complementary code is obtained by modulating an arbitrary pair of Golay complementary codes, $M=\{m_1, m_2, m_3, \ldots m_n\}$ and $N=\{n_1, n_2, n_3, \ldots n_n\}$, onto two orthogonal channels where the real component M and imaginary component N of the complex complementary code are orthogonal and functions as an in-phase spread spectrum code $C_c$ and a quadrature spread spectrum code $C_s$ in the spreading step, respectively. The in-phase spread spectrum code $C_c$ and the quadrature spread spectrum code $C_s$ are used to spread the original signal S(t) respectively and spread spectrum signals e and f are thus obtained, wherein:

$e=S(t)C_c$ $f=S(t)C_s$ (2) QPSK modulation step: modulating the spread data in a QPSK format. That is, conducting an upward frequency conversion upon the data spread by the in-phase spread spectrum code $C_c$ and the quadrature spread spectrum code $C_s$ using orthogonal carrier signals, sin(ωt) and cos(ωt), respectively, to obtain an in-phase signal g and a quadrature signal h, in which:

$g=S(t)C_c \sin(\omega t)$ $h=S(t)C_s \cos(\omega t)$

Then, combine them and obtain the output signal:

$S_t(t)=S(t)(C_c \cdot \sin(\omega t)+C_s \cdot \cos(\omega t))$

Figure 2:
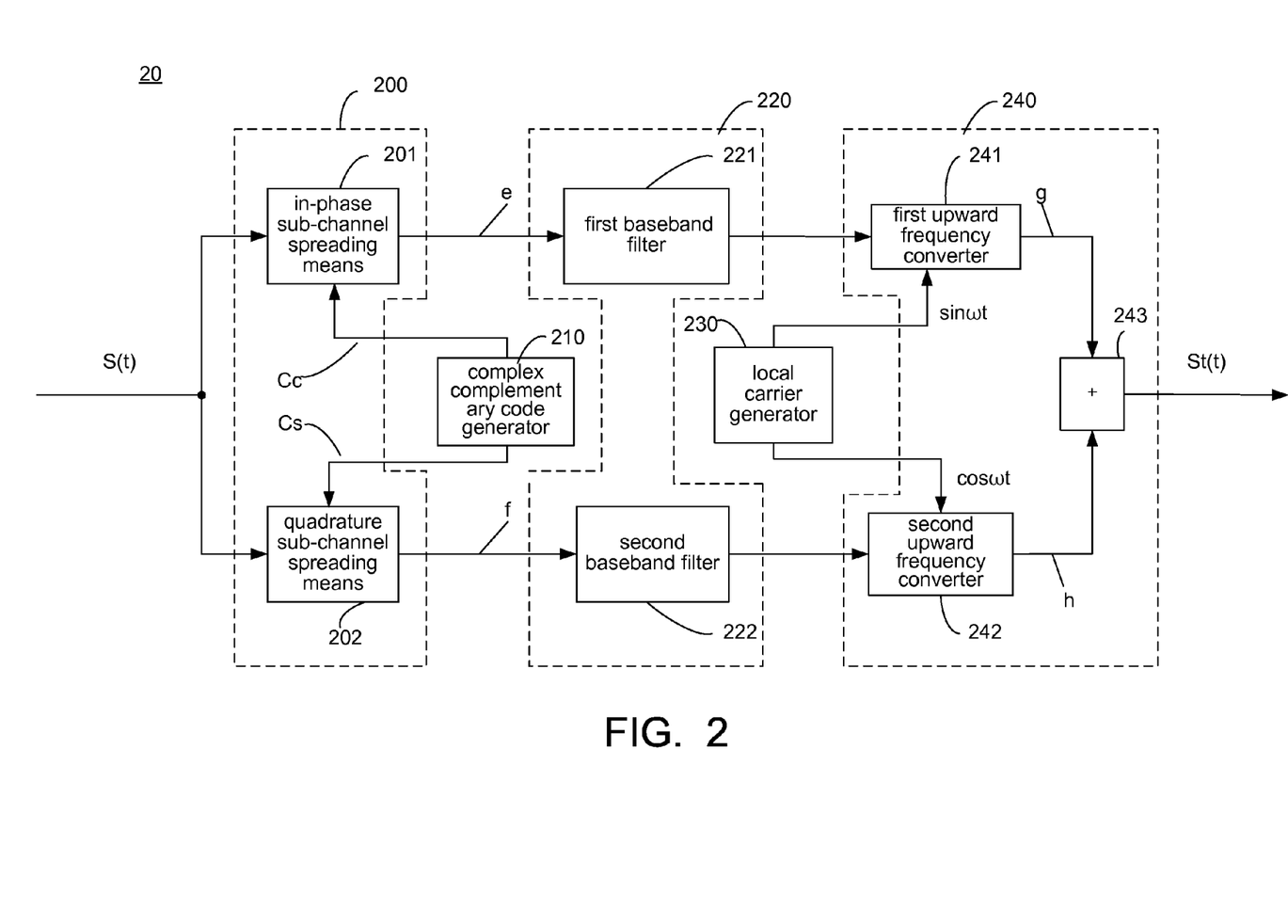
FIG. 2 is architecture block diagram of a preferred embodiment of a spreading and modulation apparatus according to the present invention.

The spreading and modulation apparatus 20 obtained according to the spreading and modulation method of the invention is illustrated in FIG. 2. The spreading and modulation apparatus 20 according to the invention includes a spreading unit 200, a filtering unit 220, a QPSK modulation unit 240 as well as a complex complementary code generator 210 and a local carrier generator 230, all of which are coupled in sequence. The constitution and workflow of each unit are described below in detail.

The complex complementary code generator 210 is used to generate the complex complementary code using an arbitrary pair of Golay complementary codes, wherein the Golay codes are generated in below manner.

A Golay complementary code with a code length of 8 is created by a=[11] and b=[10] in a manner of c=[a b a−b] where odd numbers constitute N code and even numbers constitute M code. Then, a Golay complementary code with a code length of 16 is created by C in a manner of d=[c(1:4) c(5:8) c(1:4)−c(5:8)]. By analogy, a Golay complementary code with an arbitrary code length of $2^n$ is created.

The complex complementary code is generated by utilizing Golay complementary code which is created according to a manner of $C=\{m_1, n_1{*}i, m_2, n_2{*}i, m_3, n_3{*}i, \ldots m_n, n_n{*}i\}$ That is, the complex complementary code can be obtained by modulating M code and N code onto two orthogonal channels wherein the real component and the imaginary component of the complex complementary code are orthogonal to each other, serving as the in-phase spread spectrum code $C_c$ and the quadrature spread spectrum code $C_s$.

A spreading unit 200 includes an in-phase sub-channel spreading means 201 and a quadrature sub-channel spreading means 202, wherein the in-phase sub-channel spreading means 201 and the quadrature sub-channel spreading means 202 are coupled to the complex complementary code generator 210 respectively.

The in-phase sub-channel spreading means 201 receives the in-phase spread spectrum code $C_c$ from the complex complementary code generator 210. In the meantime, the in-phase sub-channel spreading means 201 acquires the original signal (i.e. the data to be transmitted) S(t) and spreads the original signal S(t) with the in-phase spread spectrum code $C_c$ to output a signal e=S(t)$C_c$.

Likewise, the quadrature sub-channel spreading means 202 couples to the complex complementary code generator 210 so as to obtain the quadrature spread spectrum code $C_s$. In the meantime, the quadrature sub-channel spreading means 202 inputs the original signal S(t) and spreads the original signal S(t) with the quadrature spread spectrum code CS to output a signal f=S(t)$C_s$.

A filtering unit 220 includes a first baseband filter 221 and a second baseband filter 222, wherein the first baseband filter 221 is coupled to the output terminal of the in-phase sub-channel spreading means 201 and the second baseband filter 222 is coupled to the output terminal of the quadrature sub-channel spreading means 202. The first baseband filter 221 and the second baseband filter 222 are used to perform baseband-shape filtering upon the output signal e of the in-phase sub-channel spreading means 201 and the output signal f of the quadrature sub-channel spreading means 202.

The local carrier generator 230 generates a pair of orthogonal signals, a first carrier signal sin(ωt) and a second carrier signal cos(ωt), as the carriers for QPSK modulation.

The QPSK modulation unit 240 includes a first upward frequency converter 241, a second upward frequency converter 242 and an adder 243, wherein the first upward frequency converter 241 is coupled to the outputs of the first baseband filter 221 and the local carrier generator 230, the second upward frequency converter 242 is coupled to the outputs of the second baseband filter 222 and the local carrier generator 230, and the two input terminals of the adder 243 are coupled to the outputs of the first upward frequency converter 241 and the second upward frequency converter 242.

The first upward frequency converter 241 utilizes the first carrier signal sin(ωt) to conduct upward frequency conversion upon the output signal of the first baseband filter 211 such that the in-phase signal g=S(t)$C_c$ sin(ωt) is obtained. Likewise, the second upward frequency converter 242 utilizes the second carrier signal cos(ωt) to conduct upward frequency conversion upon the output signal of the second baseband filter 212 such that the quadrature signal h=S(t)$C_s$ cos(ωt) is obtained. Ultimately, the two upward frequency conversion signals c d are added in the adder 243 such that an output signal $S_t(t)$=S(t)($C_c$·sin(ωt)+$C_s$·cos(ωt)) is obtained.

Having been transmitted through the channel 104 (shown in FIG. 1), the input signal, which has been converted from analog signal to digital signal in the front end of the receiver, may be expressed as $S_r(t)$=S(t)($C_c$·sin(ωt+φ)+$C_s$·cos(ωt+φ)), wherein φ is the phase aberration of the transmitting signal after its transmission over the channel.

The despreading and demodulation method of the present invention includes the following steps.

(1) QPSK demodulation step: performing QPSK demodulation upon the signal $S_r(t)$ which is received from the channel. In this step, a downward frequency conversion is conducted upon the receiving signal with locally generated carrier signals sin(ωt) and cos(ωt) such that an in-phase signal I' and a quadrature signal Q' are obtained, in which:

$$I' = S(t)(C_c \cdot \sin(\omega t + \varphi) + C_s \cdot \cos(\omega t + \varphi))\sin(\omega t)$$
$$= S(t)(C_c \cdot \cos(\varphi) - C_c \cdot \cos(2\omega t + \varphi) + C_s \cdot \sin(2\omega t + \varphi) -$$
$$C_s \cdot \sin(\varphi))$$
$$Q' = S(t)(C_c \cdot \sin(\omega t + \varphi) + C_s \cdot \cos(\omega t + \varphi))\cos(\omega t)$$
$$= S(t)(C_c \cdot \sin(2\omega t + \varphi) + C_c \cdot \sin(\varphi) + C_s \cdot \cos(2\omega t + \varphi) +$$
$$C_s \cdot \cos(\varphi))$$

(2) low-pass filtering step: performing low-pass filtering upon the signals I' and Q' which have been demodulated in a QPSK format, filtering high frequency components to obtain an in-phase baseband signal I and a quadrature baseband signal Q, in which:

$I=S(t)(C_c\cdot\cos(\phi)-C_s\cdot\sin(\phi))$ $Q=S(t)(C_c\cdot\sin(\phi)+C_s\cdot\cos(\phi))$ (2) despreading step: using a complex complementary code, which is the same as that of the above described transmitting side, as the spread spectrum codes. The despreading operation is performed upon the in-phase baseband signal I with the in-phase spread spectrum code $C_c$, the despreading operation is performed upon the quadrature baseband signal Q with the quadrature spread spectrum code $C_s$, and the results of the two despreading operations are added to generate a main output signal "main". At the mean time, the despreading operation is performed upon the in-phase baseband signal I with the quadrature spread spectrum code $C_s$, the despreading operation is performed upon the quadrature baseband signal Q with the in-phase spread spectrum code $C_c$, and a difference between the results of the two despreading operations is obtained to generate an auxiliary output signal "aux". The calculation formula is expressed below.

$$main = I \cdot C_c + Q \cdot C_s$$
$$= (S(t)(C_c \cdot \cos(\varphi) - C_s \cdot \sin(\varphi))) \cdot C_c + (S(t)(C_c \cdot \sin(\varphi) +$$
$$C_s \cdot \cos(\varphi))) \cdot C_s$$
$$= S(t)\cos(\varphi)(C_c^2 + C_s^2)$$
$$aux = I \cdot C_s - Q \cdot C_c$$
$$= (S(t)(C_c \cdot \cos(\varphi) - C_s \cdot \sin(\varphi))) \cdot C_s - (S(t)(C_c \cdot \sin(\varphi) +$$
$$C_s \cdot \cos(\varphi))) \cdot C_c$$
$$= -S(t)\sin(\varphi)(C_c^2 + C_s^2)$$

where the "main" refers to the main output signal of the despreading operation and "aux" refers to the auxiliary output signal. $C_c^2$ and $C_s^2$ refer to the correlation value of the complex complementary codes. These two correlation values are at the maximum value when the receiving side and the transmitting side are synchronized. Let A=($C_c^2$+$C_s^2$). φ refers to the phase error between the local carrier of the receiving side and the receiving signal. The phase error φ☐0 when the receiving side and the transmitting side are synchronized. Consequently, the following equation can be obtained.

main=S(t)($C_c^2$+$C_s^2$)=S(t)·A aux=0

The result for the main sub-channel output would be the resulting spread data. Here, it is assumed that the local carrier at the receiving side is completely synchronized with the receiving signal and meanwhile the code chips at the receiving side are also completely synchronized with the receiving signal.

Due the presence of the phase error $\phi$, the despreading and demodulation method of the present invention may further include:

(4) synchronization step: eliminating the phase error $\phi$ such that the receiving side and the transmitting side are eventually synchronized. The step can be implemented by using costas-loop phase lock operation.

After phase detection, the main output signal "main" and the auxiliary output signal "aux" arrives at:

$$\text{main} \times \text{aux} = S(t)\cos(\phi)(C_c^2+C_s^2) \times (-S(t)\sin(\phi)(C_c^2+C_s^2))$$

Since $\phi$ is almost 0 and $\cos(\phi) \approx 1$ when being within pull-in range, when the receiving side and the transmitting side are fully synchronized, $C_c^2$ and $C_s^2$ are at their maximums and are constant number. The same as the above, let $A=(C_c^2+C_s^2)$, and therefore, only the sign bits are involved in phase detection. At the same time, $S(t)=1$, hence, $S^2(t)=1$. Therefore, the resulting output of the phase detection would be:

$$\text{main} \times \text{aux} = -A\sin(\phi)$$

$\sin(\phi)$ in the above expression embodies information for adjusting the local carrier generator (e.g. Numerical Controlled Oscillator, NCO), i.e., the error signal obtained after the output of the phase detector is filtered by the loop filter for adjusting the numerical controlled oscillator. For such adjusting signal, the loop filter plays a noise suppression role in the loop and functions to adjust the loop adjusting speed. The final output of loop filter adjusts the numerical controlled oscillator to implement the functionality of carrier synchronization.

Figure 3:
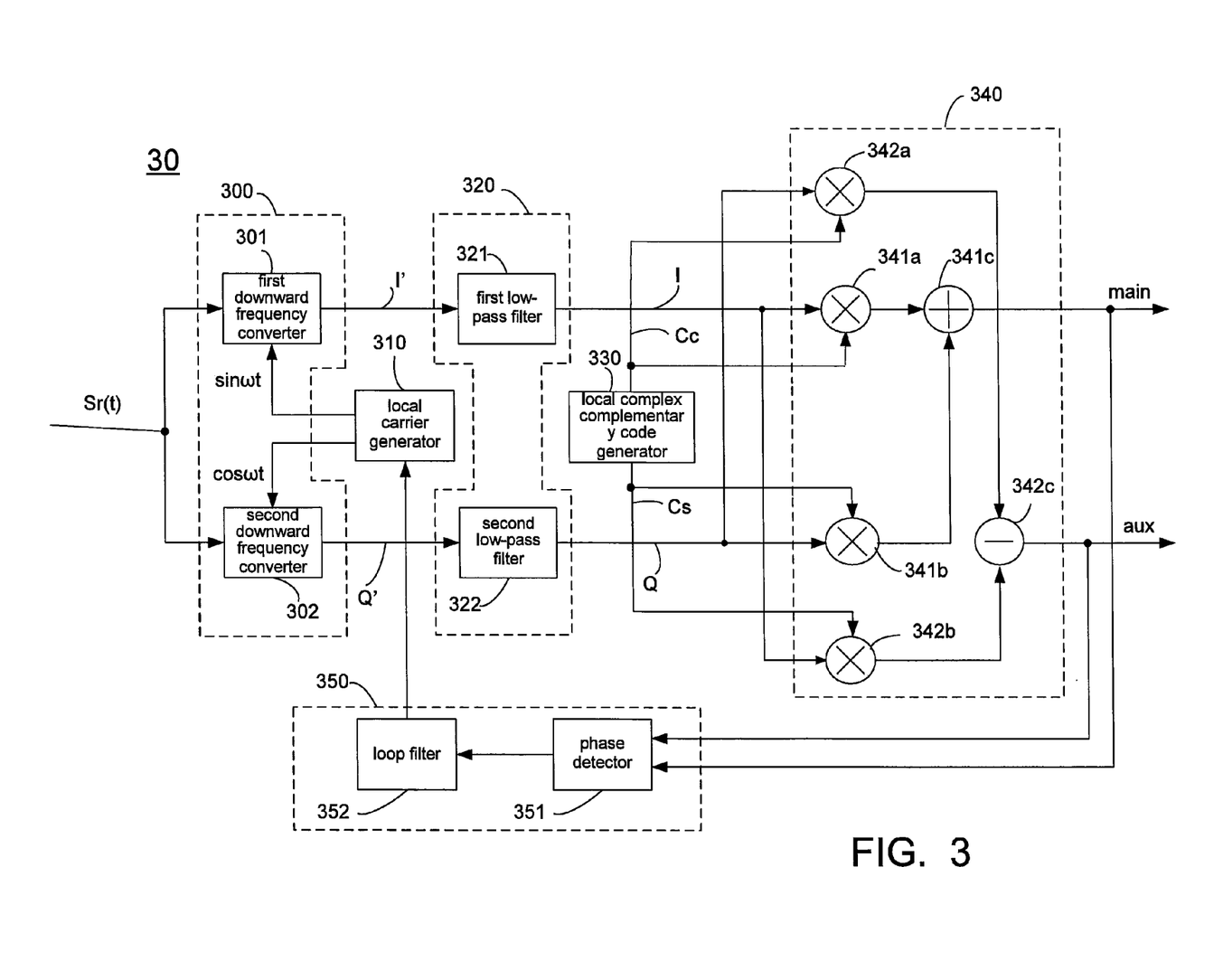
FIG. 3 is architecture block diagram of a preferred embodiment of a despreading and demodulation apparatus according to the present invention.

FIG. 3 refers to a despreading and demodulation apparatus obtained according to the despreading and demodulation method of the present invention. The receiving signal illustrated in FIG. 3 is a digital signal converted from an input signal of the front end of the receiver by A/D conversion. The despreading and demodulation apparatus 30 according to the present invention includes a QPSK demodulation unit 300, a local carrier generator 310, a filtering unit 320, a local complex complementary code generator 330, a despreading unit 340 and a phase-locked unit 350. The constitution and workflow of each unit are described below in detail.

The local carrier generator 310 generates a pair of orthogonal signals, a first carrier signal $\sin(\omega t)$ and a second carrier signal $\cos(\omega t)$, serving as carriers for QPSK demodulation.

QPSK demodulation unit 300 includes a first downward frequency converter 301 and a second downward frequency converter 302, wherein the first downward frequency converter 301 and the second downward frequency converter 302 are coupled to the local carrier generator 310 respectively. The first downward frequency converter 301 conducts downward frequency conversion upon the receiving signal with the first carrier signal $\sin(\omega t)$ such that an in-phase signal I' is obtained. Similarly the second downward frequency converter 302 conducts downward frequency conversion upon the receiving signal with the second carrier signal $\cos(\omega t)$ such that a quadrature signal Q' is obtained.

$$I' = S(t)(C_c \cdot \sin(\omega t + \varphi) + C_s \cdot \cos(\omega t + \varphi))\sin(\omega t)$$

$$= S(t)(C_c \cdot \cos(\varphi) - C_c \cdot \cos(2\omega t + \varphi) + C_s \cdot \sin(2\omega t + \varphi) -$$

$$C_s \cdot \sin(\varphi))$$

-continued $$Q' = S(t)(C_c \cdot \sin(\omega t + \varphi) + C_s \cdot \cos(\omega t + \varphi))\cos(\omega t)$$

$$= S(t)(C_c \cdot \sin(2\omega t + \varphi) + C_c \cdot \sin(\varphi) + C_s \cdot \cos(2\omega t + \varphi) +$$

$$C_s \cdot \cos(\varphi))$$

The filtering unit 320 includes a first low-pass filter 321 and a second low-pass filter 322, wherein the first low-pass filter 321 is coupled to output of the first downward frequency converter 301 and output an in-phase baseband signal I after filtering operation, and the second low-pass filter 322 is coupled to output of the second downward frequency converter 302 and output a quadrature baseband signal Q after filtering operation, in which:

$$I = S(t)(C_c \cdot \cos(\phi) - C_s \cdot \sin(\phi))$$

$$Q = S(t)(C_c \cdot \sin(\phi) + C_s \cdot \cos(\phi))$$

The local complex complementary code generator 330 is similar to the complex complementary code generator 210 of the transmitting side. It generates a pair of complex complementary codes which are the same as that of the transmitting side, serving as the in-phase spread spectrum code $C_c$ and the quadrature spread spectrum code $C_s$.

The despreading unit 340 includes a main sub-channel despreading module and an auxiliary sub-channel despreading module, in which:

The main sub-channel despreading module further includes a first despreading means 341a, a second despreading means 341b and an adder 341c. The first despreading means 341a is coupled to the local complex complementary code generator 330 and the first low-pass filter 321. The second despreading means 341b is coupled to the local complex complementary code generator 330 and the second despreading means 322. The adder 341c is coupled to two despreading means 341a and 341b.

The auxiliary sub-channel despreading module further includes a first despreading means 342a, a second despreading means 342b and a subtractor 342c. The first despreading means 342a is coupled to the local complex complementary code generator 330 and the second low-pass filter 322. The second despreading means 342b is coupled to the local complex complementary code generator 330 and the first low-pass filter 321. The subtractor 342c is coupled to two despreading means 342a and 342b.

The main sub-channel despreading module and the auxiliary sub-channel despreading module perform below operations.

$$\text{main} = I \cdot C_c + Q \cdot C_s$$

$$= (S(t)(C_c \cdot \cos(\varphi) - C_s \cdot \sin(\varphi))) \cdot C_c + (S(t)(C_c \cdot \sin(\varphi) +$$

$$C_s \cdot \cos(\varphi))) \cdot C_s$$

$$= S(t)\cos(\varphi)(C_c^2 + C_s^2)$$

$$\text{aux} = I \cdot C_s - Q \cdot C_c$$

$$= (S(t)(C_c \cdot \cos(\varphi) - C_s \cdot \sin(\varphi))) \cdot C_s - (S(t)(C_c \cdot \sin(\varphi) +$$

$$C_s \cdot \cos(\varphi))) \cdot C_c$$

$$= -S(t)\sin(\varphi)(C_c^2 + C_s^2)$$

where "main" refers to a main output signal of dispreading operation. It contains transmitting data of the transmitting side. The "aux" refers to an auxiliary output signal.

The phase-locked unit 350 includes a phase detector 351 and a loop filter 352. The input terminal of the phase detector 351 is coupled to the output terminals of the main sub-channel despreading module and the auxiliary sub-channel despreading module respectively. The input terminal of the loop filter 352 is coupled to the output terminal of the phase detector 351. The output terminal of the loop filter is coupled to the local carrier generator of the QPSK demodulation unit. The main output signal "main" and the auxiliary output signal "aux" are passed to the phase detector 351 to conduct a phase detection processing, or multiplication processing, wherein the main output signal "main" is involved in the operation only with its sign bit. The output of the phase detector 351 is expressed below.

$$\text{main} \times \text{aux} = -A \sin(\phi)$$

The phase detected signal, which is output from the phase detector 351, is processed by the loop filter 352 and becomes an error signal for controlling the numerical controlled oscillator (i.e. the local carrier generator 310) thereafter. The loop filter may be a first order low-pass filter. Ultimately, the output of the loop filter 352 enters into the local carrier generator 310 to adjust the output of the local carrier generator such that the carrier synchronization function is accomplished.

INDUSTRIAL APPLICATION

The method and apparatus for spread spectrum modulation and demodulation according to the present invention assures very little influence caused by the cross correlation property of code chips for different cells and thus significantly reduce the interference between difference cells provided that the synchronization between different cells using different complex complementary codes be controlled within the range of ±3 bit. Therefore, the present invention is particularly applicable to power line carrier communication (PLC) since synchronization can be achieved accurately in the power line carrier communication.

What is claimed is:

1. A spreading and modulation method, comprising a step for spreading an original signal with spread spectrum codes and a step for modulating said spread data in a QPSK format, characterized in that:

said spreading step comprises:
generating spread spectrum code chips by modulating an arbitrary pair of Golay complementary codes onto two orthogonal channels to obtain a complex complementary code as said spread spectrum code chips; and
spreading said original signal with said complex complementary code;
said complex complementary code comprises a real component and an imaginary component, which are orthogonal to each other, as an in-phase spread spectrum code and a quadrature spread spectrum code respectively; and
in the step of spreading said original signal with said complex complementary code, spreading an in-phase sub-channel of said original signal with said in-phase spread spectrum code and spreading a quadrature sub-channel of said original signal with said quadrature spread spectrum code.

2. A despreading and demodulation method, comprising a step for demodulating a receiving signal in a QPSK format, a filtering step for filtering the QPSK demodulated signal so as to generate an in-phase baseband signal and a quadrature baseband signal, and a despreading step for despreading said in-phase baseband signal and said quadrature baseband signal, characterized in that:

said despreading step includes the following steps:
generating the same spread spectrum code chips as that of a transmitting side by modulating a pair of Golay complementary codes onto two orthogonal channels to obtain a complex complementary as said spread spectrum code chips; and
despreading said in-phase baseband signal and said quadrature baseband signal with said complex complementary code.

3. The despreading and demodulation method of claim 2, wherein:

said complex complementary code comprises a real component and an imaginary component, which are orthogonal to each other, as an in-phase spread spectrum code and a quadrature spread spectrum code respectively; and
in the step of despreading said receiving signal with said complex complementary code:
despreading said in-phase baseband signal with said in-phase spread spectrum code and said quadrature spread spectrum code respectively, despreading said quadrature baseband signal with said in-phase spread spectrum code and said quadrature spread spectrum code respectively; and
adding the despreading result of said in-phase baseband signal and said in-phase spread spectrum code and the despreading result of said quadrature baseband signal and said quadrature spread spectrum code to obtain a main output signal comprising an original signal of said transmitting side, and performing subtraction between the despreading result of said quadrature baseband signal and said in-phase spread spectrum code and the despreading result of said in-phase baseband signal and said quadrature spread spectrum code to obtain an auxiliary output signal.

4. The despreading and demodulation method of claim 2, wherein, the method further comprises a synchronization step for performing phase detection and loop filtering upon said main output signal and said auxiliary output signal to obtain a phase error signal for local carrier synchronization.

5. A spreading and modulation apparatus, wherein said apparatus comprises:

a complex complementary code generator for modulating an arbitrary pair of Golay complementary codes onto two orthogonal channels to obtain a complex complementary code;
a spreading unit for receiving said complex complementary code from said complex complementary code generator and spreading an original signal with said complex complementary code;
a local carrier generator for generating a pair of orthogonal sinusoid modulation signals for QPSK modulation; and
a QPSK modulation unit for modulating the signal spread by said spreading unit in a QPSK format with a pair of said sinusoid modulation signals.

6. The spreading and modulation apparatus of claim 5, wherein:

said complex complementary code comprises a real component and an imaginary component, which are orthogonal to each other, as an in-phase spread spectrum code and a quadrature spread spectrum code respectively; and
said spreading unit comprises:
an in-phase sub-channel spreading means coupled to said complex complementary code generator to spread said original signal with said in-phase spread spectrum code;

a quadrature sub-channel spreading means coupled to said complex complementary code generator to spread said original signal with said quadrature spread spectrum code.

7. The spreading and modulation apparatus of claim 5, wherein said apparatus further comprises a filtering unit coupled between said spreading unit and said QPSK demodulation unit, and said filtering unit delivers its output to said QPSK modulation unit after performing baseband filtering upon the signal spread by said spreading unit.

8. A despreading and demodulation apparatus, said apparatus comprises:
- a local carrier generator for generating a pair of orthogonal sinusoid modulation signals for QPSK demodulation;
- a QPSK demodulation unit for demodulating a receiving signal in a QPSK format with said pair of sinusoid modulation signals and outputting QPSK demodulated signals;
- a filtering unit for performing low-pass filtering upon said QPSK demodulated signals and outputting an in-phase baseband signal and a quadrature baseband signal;
- a local complex complementary code generator for modulating a pair of Golay complementary codes onto two orthogonal channels to generate the same complex complementary code as that of a transmitting side;
- a despreading unit for receiving said complex complementary code generated by said local complex complementary code generator, despreading said in-phase baseband signal and said quadrature baseband signal with said complex complementary code, outputting a main output signal containing an original signal of said transmitting side and outputting an auxiliary output signal.

9. The despreading and demodulation apparatus of claim 8, wherein:
- said complex complementary code comprises a real component and an imaginary component, which are orthogonal to each other, as an in-phase spread spectrum code and a quadrature spread spectrum code respectively;
- a main sub-channel despreading module for despreading said in-phase baseband signal with said in-phase spread spectrum code, despreading said quadrature baseband signal with said quadrature spread spectrum code, and adding the results of said two despreading operations to obtain a main output signal containing said original signal of said transmitting side; and
- an auxiliary sub-channel despreading module for despreading said in-phase baseband signal with said quadrature spread spectrum code, despreading said quadrature baseband signal with said in-phase spread spectrum code, and performing subtraction between the results of said two despreading operations to obtain an auxiliary output signal.

10. The despreading and demodulation apparatus of claim 9, wherein said main sub-channel despreading module comprises:
- a first despreading means for despreading said in-phase baseband signal with said in-phase spread spectrum code;
- a second despreading means for despreading said quadrature baseband signal with said quadrature spread spectrum code; and
- an adder for adding the results of said two despreading operations to obtain said main output signal.

11. The despreading and demodulation apparatus of claim 9, wherein said auxiliary sub-channel despreading unit comprises:
- a first despreading means for despreading said in-phase baseband signal with said quadrature spread spectrum code;
- a second despreading means for despreading said quadrature baseband signal with said in-phase spread spectrum code; and
- a subtracter for performing subtraction between the results of said two despreading operations to obtain said auxiliary output signal.

12. The despreading and demodulation apparatus of claim 8, wherein said apparatus further comprises a phase-locked unit, said phase-locked unit comprising:
- a phase detector for performing phase detection upon said main output signal and said auxiliary output signal to obtain a phase detection signal; and
- a loop filter coupled to the output of said phase detector for outputting a phase error signal to said QPSK demodulation unit.

* * * * *

UNITED STATES PATENT AND TRADEMARK OFFICE
CERTIFICATE OF CORRECTION

PATENT NO. : 8,040,935 B2
APPLICATION NO. : 12/093525
DATED : October 18, 2011
INVENTOR(S) : Song et al.

It is certified that error appears in the above-identified patent and that said Letters Patent is hereby corrected as shown below:

Column 7, line 55 "c d" should be --c, d--

Column 7, line 60, two occurrences of "ф" should be --φ--

Column 7, line 61, "ф" should be --φ--

Column 8, line 21, two occurrences of "(ф)" should be --(φ)--

Column 8, line 23, two occurrences of "(ф)" should be --(φ)--

Column 8, line 60, "ф" should be --φ--

Column 8, line 62, "ф 0" should be --φ = 0--

Column 9, line 7, "ф," should be --φ,--

Column 9, line 10, "ф" should be --φ--

Column 9, line 17, two occurrences of "(ф)" should be --(φ)--

Column 9, line 19, two occurrences of "ф" should be --φ--

Column 9, line 27, "(ф)" should be --(φ)-- and remove the additional spaces so the formula looks like this:
$$main \times aux = -A \sin(\varphi)$$

Column 9, line 28, "(ф)" should be --(φ)--

Column 10, lines 17 and 19, "(ф)" should be --(φ)--

Column 11, line 14, "(ф)" should be --(φ)--

Signed and Sealed this
Twenty-seventh Day of December, 2011

David J. Kappos
*Director of the United States Patent and Trademark Office*